Patented Dec. 26, 1939

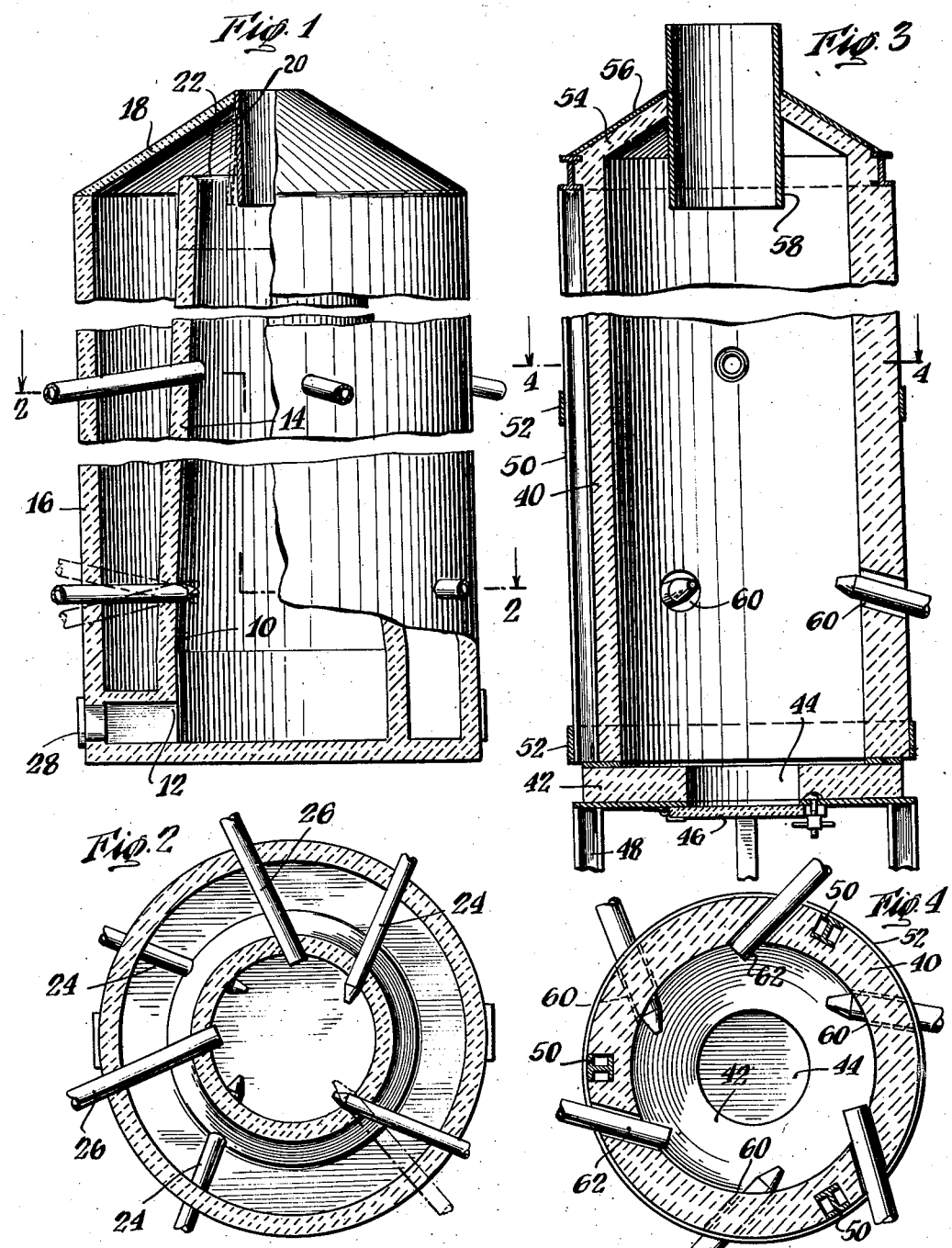

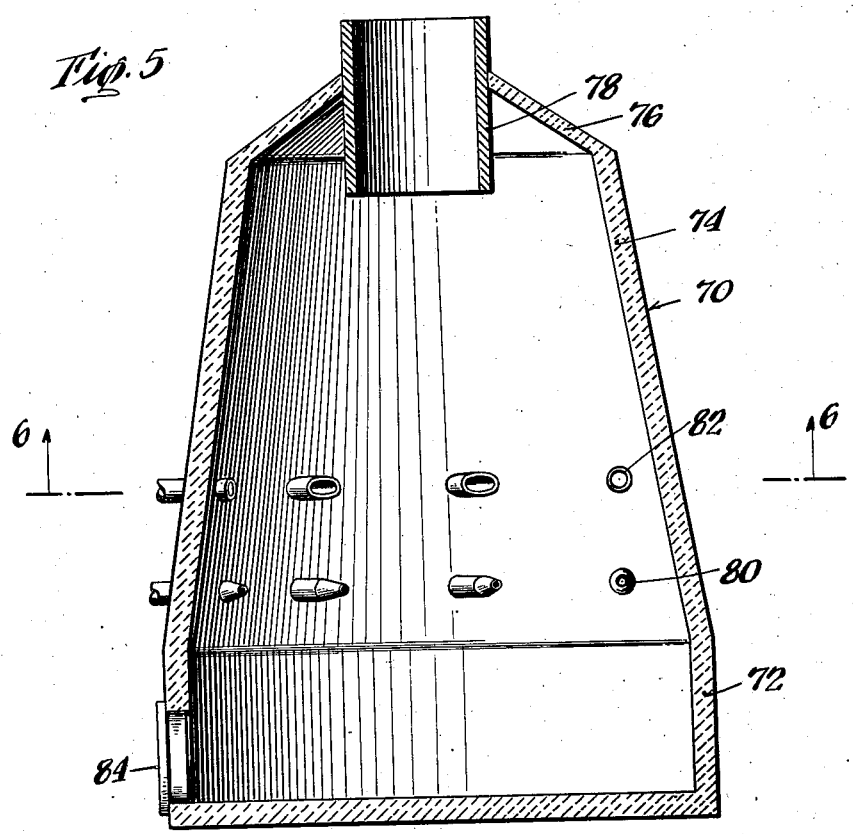
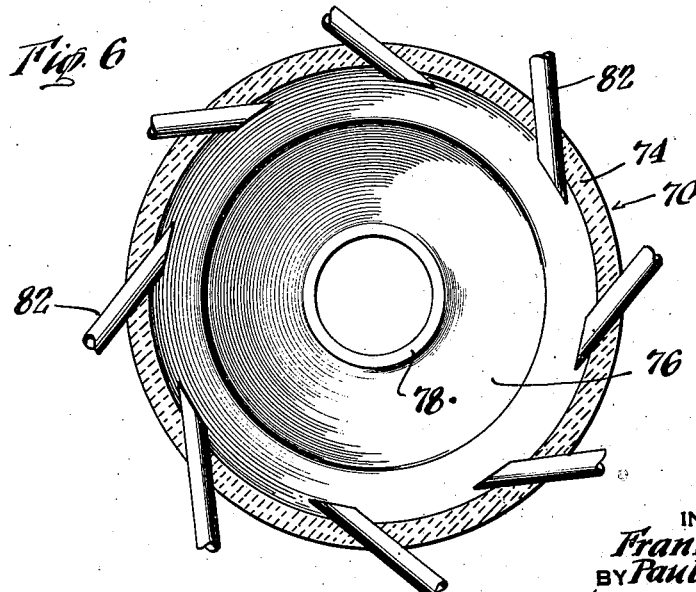

2,184,300

UNITED STATES PATENT OFFICE 2,184,300

METHOD OF BENEFICIATING OR REDUCING ORES TO METAL

Frank Hodson and Paul A. Hirsch, New York, N. Y.

Application October 6, 1937, Serial No. 167,542

11 Claims. (Cl. 75—26)

This invention relates to processes for beneficiating or enriching the metallic content of ores, and particularly relates to processes for reducing ores to a metallic state.

The standard methods of reducing ores, such as, for example, iron ores, require the use of iron ore in lumpy form, because otherwise there is a considerable loss of iron ore as dust in the operation. Moreover, powdered ores cannot be used in this type of reducing operation because they tend to accumulate on the walls of the furnace shaft and clog up the inside of the furnace.

The fact that powdered or finely divided ores cannot be used directly in the usual type of blast furnace prevents the use of certain types of ores which are unobtainable in lump form with a sufficiently high iron or iron oxide content to render their reduction commercially practical. Some forms of magnetite ores, for example, are found mixed with rock, and must be crushed to a very fine state to allow magnetic separation of the ore from the rock to produce a concentrated ore. Other forms of magnetite ore are found in sandy formations, in a finely divided form and are easily concentrated to high iron content by magnetic separation.

Ores of these types cannot be used in the ordinary blast furnace without first agglomerating them or forming them into chunks or lumps of suitable size. This lumping step increases the cost of producing the iron and as a result has rendered the production of iron from these ores unprofitable.

Certain low temperature processes are also known in which the furnace is externally fired and the reducing action is produced by contacting coarse particles of ore with a rising column of gases. The process is applicable to only very few types of ores and cannot be utilized for reducing iron ores.

An object of this invention is to provide a process which renders the production of iron, steel and steel alloys from finely divided ores commercially practical.

A further object of the invention is to provide processes for treating finely divided ores to produce finely divided metals of a high degree of purity.

A still further object of the invention is to provide processes by means of which iron or steel alloys may be produced in the reduction furnace from iron ores and added alloying elements.

The apparatus hereinafter more particularly described and the processes embodying our invention may be applied to the beneficiation and/or reduction of all types of ores, and is particularly adapted to the treatment of iron ore or other iron-bearing materials. It is particularly suitable for handling magnetite ores and also other forms of iron oxides, iron carbonates, and compounds of iron and sulphur.

Generally, the process consists of charging the ore in a finely divided state and reducing agents to a furnace shaft, which is provided with blowers for injecting fuel and air into the interior of the shaft to produce a turbulent column of flame of sufficient velocity to maintain the ore and reducing agents in suspension until the ore is reduced to metallic form.

The ore charge must be in such physical form, that is, state of subdivision, that the current of air, flame, or gaseous stream can keep the particles of ore in suspension for a definite period of time. We have found that the velocity of gas blown into the furnace shaft will vary between 4,000 and 10,000 feet per minute, depending upon the size of the furnace shaft and the particle size and weight.

The air and fuel and the reducing material fed with the ore must be so proportioned that a favorable carbon monoxide balance is maintained in the furnace shaft, whereby the carbon monoxide can combine with the oxygen or oxides of the ore to produce carbon dioxide and the metal. It will be understood that an excess of fuel must be provided and that the blast rate and pressures in the furnace shaft, as well as the temperature in the shaft, are so proportioned that carbon monoxide is always present in contact with the ore, whereby the carbon monoxide can react with and reduce the metallic oxide to metal. Another essential condition of the process is that the carbon dioxide should be drawn off or converted to carbon monoxide substantially as rapidly as it is formed, so that the possibility of reoxidizing the reduced metal is materially reduced.

An important feature of the process is that the finely divided ore, while maintained in suspension, is in continuous and intimate contact with the reducing media. The finely divided particles of ore present a much greater surface area than larger particles. This greatly increased surface area allows the gases to reduce the surface portions of the particles almost instantaneously. The film of carbon dioxide that forms on or surrounds the particles because of the reaction of the carbon monoxide with the ore is removed by the rubbing of the particles in the turbulent column of flame almost as rapidly as it is formed, thereby allowing rapid completion of the reduction of the ore to metal.

The size of the particles of ore may be varied considerably, but preferably the ore is pulverized to an almost impalpable powder. The ore may be reduced to colloidal particle size, which form may be produced by subjecting finely divided ore and oil to the action of a colloid mill. An Eppenbach colloid mill has been found to be entirely suitable for this preparatory step. Such reducing agents as coal may also be added to the oil with the ore and reduced to a colloidal state.

The apparatus for carrying forward our process is constructed to cause injection of the fuel and the air in such a way as to produce a great turbulence in the interior of the furnace shaft. In one form of apparatus the fuel and air-injecting nozzles are directed substantially tangentially to the periphery of the furnace shaft, and thereby create a gyrating column of flame directed upwardly of the furnace shaft. This flame causes rapid movement of the particles of ore therein, and also maintains them in suspension until their particle weight is increased sufficiently by the change from the oxide to metal to allow the particles to be thrown out centrifugally, or to settle out because of their increased specific gravity, and be deposited on the floor of the furnace chamber. It will be understood that the fuel injectors and ore injectors can be arranged in any desired way to produce a turbulent column of flame and gas of sufficient velocity to suspend the ore in the furnace shaft until the ore is reduced to metal. Also, the turbulence may be controlled by the use of baffles in the furnace shaft. Helical baffles may be used to maintain a spiralling flow of gas and flame, if desired.

If desired, the furnace chamber can be tapered upwardly to create a swirling action of gradually increasing velocity whereby the particles, which are carried upwardly by the flow of gases, will ultimately be thrown out due to the increased centrifugal force, or may settle out because of their increased specific gravity. Suitable separating mechanisms can be used to remove the metallic particles from the zone of turbulence and to eliminate dust losses.

If desired, the ore charge with the reducing agent, which may be hydrogen or hydrocarbon gases, carbon or coke, or other carbonaceous material in liquid, gaseous, powdered or colloidal form, may also be blown into the interior of the furnace through suitable discharge nozzles. These nozzles may be directed substantially radially or non-radially into the furnace shaft and may be directed either in the same direction as the fuel injecting nozzles, or in a counter direction.

It will be understood that any desired type of fuel may be used for heating the furnace shaft and for creating the reducing gases, but we prefer to use fuels such as finely divided carbon, coal, or coke, oil, carbon monoxide, hydrocarbon gas, or hydrogen.

The process may be carried out at such a temperature that the metal reduced from ore is not in a molten state. It has been found that the reducing action will take place at temperatures below the melting point of the metal derived from the ore. This phase of the process is advantageous in that there is less opportunity for the metal to absorb carbon, sulphur, and other impurities which are normally taken up by molten metal. The product will thus be in a purer state than that produced by the usual reduction processes. However, if desired, the process may be carried out at a sufficiently high temperature to produce molten metals which may be collected in the bottom of the furnace. With this type of operation it may be desirable to introduce fluxing agents for separating impurities from the reduced metal. Likewise, if desired, alloying materials of any desired type may be injected into the furnace to produce directly alloys of any desired composition from the ores being treated.

For a better understanding of the present invention, reference may be had to the accompanying drawings in which:

Figure 1 is a side elevation of a furnace shaft, partly broken away and partly in section, embodying the present invention;

Figure 2 is a sectional view of the furnace shaft taken on the line 2—2 of Figure 1;

Figure 3 is a view in vertical section of a modified form of furnace shaft embodying the invention;

Figure 4 is a sectional view taken on the line 4—4 of Figure 3;

Figure 5 is a view in vertical section of another form of reducing furnace; and

Figure 6 is a sectional view taken on line 6—6 of Figure 5.

In the form of the invention illustrated in Figures 1 and 2, the blast furnace may consist of a furnace shaft 10 having a lower cylindrical portion 12 and an upper converging frusto-conical portion 14. The furnace shaft 10 is enclosed in an outer wall 16 of cylindrical shape, which is spaced from the furnace shaft 14 to produce an annular space for receiving part of the reduced metal thrown out by centrifugal action of the swirling column of flame and gas in the furnace shaft. Some of the metal may settle out in the furnace shaft 10 due to its increased specific gravity. The furnace shaft is closed by means of a conical or frusto-conical top 18, carried by the wall 16 at its upper end. In the central portion of the top is mounted a downwardly extending exhaust flue 20, through which pass the products of combustion of the fuel and the exhaust gases produced in the reducing action. The flue 20 preferably has its lower edge disposed below the top of the furnace shaft 10, whereby a skimming slot 22 is provided for separating the metallic particles from the column of gas and flame. The flue 20 may be connected to a dust collector (not shown), of any desired type, to receive and recover ore dust and metallic particles which might be entrained and carried out of the furnace shaft by the rising column of gases.

Fuel and air are fed into the furnace shaft 10 through a plurality of nozzles 24, which pass through the walls 14 and 16 and have their ends disposed within the furnace shaft. As best shown in Figure 2, the fuel-injecting nozzles 24 are arranged non-radially of the furnace shaft and all directed in the same direction whereby, upon injection of the fuel and air, a rotating column of gas and flame is produced extending vertically of the furnace shaft. The nozzles 24 may be directed parallel to the bottom of the furnace shaft, as shown in full lines in Figure 1, or they may be inclined to the horizontal, as shown in dotted lines in Figure 1. Likewise, the angle at which the fuel-injecting nozzles 24 are inclined to the diameter of the shaft may be varied between substantially radially of, as shown in dotted lines, and substantially tangentially to the furnace shaft, as shown in full lines in Fig. 2.

Finely divided ore, reducing agents, such as powdered coal, coke or carbon, and fluxing materials may be fed into the furnace through the charge-injecting nozzles 26, which are located above the fuel-injecting nozzles 24. The charge-injecting nozzles may be non-radially disposed in the furnace shaft to blow the charge into the rotating or turbulent column of flame and gases. The inclination of the charge-injecting nozzles 26 may be varied both with respect to the radius of the shaft and with respect to the horizontal, as desired. Likewise, the ore-injecting nozzles may be disposed below the fuel-injecting nozzles to direct the ore upwardly into the column of flame, or the ore may be charged from the top of the furnace shaft and allowed to fall into the column of flame. The number of nozzles 24 and 26 may be varied.

Any desired type of blower may be used for injecting the fuel and air and the charge into the interior of the furnace shaft. Many such blowers for finely divided or pulverized fuels are known in the market and it is therefore believed unnecessary to include a description of the same.

The furnace shaft 10 and the outer wall 16 of the furnace may be provided with clean-out doors 28 and 30, respectively, for removing the reduced metal and the accumulated ash or solid residue produced by the combustion of the fuel and reduction of the metallic ore.

In operation, fuel and air are injected through the nozzles 24, ignited and the furnace shaft brought up to the desired temperature. Finely divided ore and reducing agents are then blown through nozzles 26 into the column of flame produced by combustion of the fuel, and the particles of ore are whirled in the column of flame and blown upwardly, thereby contacting their entire surface portions with the reducing gases created by partial combustion of the fuel. The particles rub against each other in the column of flame, removing the skin of carbon dioxide which is formed during the reducing action, and allowing the reduction to penetrate rapidly into the center of the finely divided particles of ore. The rising column of gases and flame lift the particles upwardly and spin them at increasing angular velocity, due to the decreasing cross-sectional area of the furnace shaft. The centrifugal force exerted on the particles of reduced ore forces them to the outer edge of the rising and spinning column of flame and gases where some of the particles are skimmed out by the skimming slot 22 and gradually settle into the annular space between the furnace shaft 10 and the outer wall 16 of the furnace from where they may be withdrawn through the clean-out doors 28. The remainder may settle out due to the increase in their specific gravity. The carbon dioxide generated by combination of the carbon monoxide produced by combustion of the fuel with the oxygen separated from the ore passes out through the flue 20.

The gaseous products of combustion and reaction and some entrained metallic powder or dust will pass to the separator where the dust is removed. The collected material may, if desired, be subjected to a magnetic separation operation and the metallic particles mixed with the other reduced metal.

In Figures 3 and 4 another form of blast furnace is illustrated. This type of blast furnace may consist of a furnace shaft 40 of generally cylindrical shape supported on a base 42, which is provided with a clean-out opening 44. The clean-out opening may be provided with hinged covers 46 through which the reduced metal and other non-metallic materials, such as ash, may be removed. The shaft 40 is preferably mounted with the base 42 spaced from the floor a sufficient distance that trucks for receiving the reduced metal may be run thereunder. The spaced or elevated relationship of the furnace shaft may be produced by mounting the entire structure upon a plurality of girders 48, which are set with their lower ends embedded in a concrete base.

The furnace shaft 40 may be made of fire brick, refractory material or heat resisting alloys of any desired type and may be braced longitudinally by means of girders 50 extending the length of the furnace shaft. The shaft 40 may also be braced against lateral stresses by means of encircling steel bands 52 spaced apart along the length of the shaft 40, as required. The top of the shaft 40 is closed by a conical cover 54 integral therewith, which may be rigidified and strengthened by means of a conical or frusto-conical steel plate 56.

Extending down through the center of the conical cap 54 is an exhaust tube 58 which terminates within the interior of the furnace shaft 40. The exhaust tube 58 may be made of any suitable refractory material and is preferably connected to a dust collector, not shown, of any suitable type, such as a cyclone or electrostatic separator.

As best shown in Figure 4, the furnace shaft 40 may be provided with a plurality of burner openings 60, which open non-radially into the center of the shaft 40. The inclination of the burner openings may be varied in the manner set forth in the description of Figures 1 and 2. The shaft 40 is also provided with a plurality of ore or charge inlets 62 which, as illustrated in Figure 4, are directed non-radially of the furnace shaft 40. The ore inlets 62 may be likewise varied with respect to their inclination to the horizontal and radially of the furnace shaft in the manner set forth in the description of the similar ore inlets disclosed in Figures 1 and 2.

In operation, the fuel is injected through the burner openings 60 in admixture with a sufficient quantity of air to support combustion and the furnace shaft 40 brought up to temperature. Combustion of the fuel produces carbon monoxide gas and a column of flame and other gases, which have sufficient velocity to temporarily suspend a continuously fed charge of ore in a pulverulent state and a reducing agent, such as powdered coke or coal. The charge is fed through the ore inlets 62 and, upon contact with the turbulent column of flame and reducing gases, is lifted upwardly through the furnace shaft and subjected to centrifugal force. The centrifugal force and increased specific gravity of the particles, due to reduction to metal, causes them to be thrown outwardly of, or to settle from, the column of flame and gases into a relatively quiet zone adjacent the wall of the furnace shaft 40 in which they are allowed to settle to the bottom of the shaft. The collected particles of metal, ash and other impurities may be drawn out through the clean-out door 44 and subjected to a separation treatment to remove the purified metal. It will be understood that the temperature of the furnace shaft may be regulated by the quantity of fuel fed thereinto, and, if desired, a sufficiently high temperature may be used to reduce the ore and produce the metal in a molten state. It will likewise be understood that alloying ingredients and fluxes may be injected with the ore charge and a molten alloy produced.

In Figs. 5 and 6 is disclosed another type of reducing furnace, consisting of a furnace shaft 70 consisting of a lower cylindrical portion 72 and an upper conical or frusto-conical portion 74 which is closed by a frusto-conical cover or top 76. The top 76 is provided with an exhaust flue 78 through which the gases may escape to a separator (not shown). The furnace shaft 70 may be provided with fuel-injecting nozzles 80 and charge-injecting nozzles 82 arranged in substantially the same way as the corresponding parts of the furnaces disclosed in Figures 1 to 4. The shaft 70 is also provided with one or more clean-out doors 84 through which the metal and residues may be removed.

In this device the particles of reduced metal are separated from the gases and materials having lower specific gravities by the increase in their specific gravity which overcomes the lifting effect of the turbulent gases and allows them to settle on the bottom of the furnace shaft.

While we have described the furnace shafts as being arranged vertically, it will be understood that they may also be arranged horizontally, the same reduction action and centrifugal separation taking place in a horizontal shaft.

By way of specific example, we have produced finely divided iron by injecting a pulverized magnetite ore, which is of sufficient fineness that 70 to 80% will pass through a 200-mesh sieve. This finely divided ore is mixed with powdered coal of a like fineness, that is, so finely divided that 70 to 80% of the coal will pass through a 200-mesh sieve. Coal of like fineness is used as fuel.

When using a furnace shaft 30 feet long and having an inside diameter of about 8 feet, a blast velocity of between 4,000 and 6,000 feet per minute produces a satisfactory suspension of the ore and will allow the metallic particles produced by reduction in the flame to settle out.

It will be understood that the blast volume or rate will be varied, depending upon the size of furnace shaft used, and likewise must be varied if ore of different particle size and specific gravity is used. Each of these conditions of blast rate, specific gravity, particle size and diameter and size of furnace shaft may be determined by a simple experiment to produce the desired suspension and separation of the reduced metal. For furnace shafts of average size it ordinarily will be unnecessary to use a blast velocity in excess of 10,000 feet per minute.

The particle size, while preferably on the order of that set forth in the above specific example, may be increased or decreased.

A suspension of the ore in oil in which the ore particles may be as small as colloidal size, either with or without other reducing agents of similar particle size, may be used to great advantage. The colloidal size of the particles renders reduction under proper conditions substantially instantaneous. Also, the liquid state of the charge greatly facilitates its injection into the furnace shaft. By properly proportioning the oil and ore, the charge may also serve as the fuel, allowing the elimination of additional sources of flame and reducing gases.

It will be understood from the foregoing that we have produced apparatuses and processes which are particularly adapted to handle finely divided ores of all types which were hitherto impractical to use in the ordinary type of blast furnace.

The term "ore", used in the specification, and the claims, is intended to include natural metal-bearing ores and metallic residues, such as oxidized scrap, iron rust and similar materials, which include metallic oxides.

The term "beneficiation" is intended to cover the treatment of low grade ores, particularly iron ores, to enrich their metallic content either to render them susceptible to further reduction in conventional apparatuses such as, for example, blast furnaces, or to reduce the ore completely to metal.

It likewise will be understood that the apparatuses described herein may be of varied size and proportions and that the shape may be altered as desired, so long as they are of sufficient length and shape to promote the formation of a turbulent or spinning column of flame and gases of such velocity as to suspend the particles of ore during the reducing action. Therefore, the above-described specific example of the process and apparatus should be considered as illustrative only and not as limiting the scope of the claims.

We claim:

1. The process of reducing ore to metal comprising introducing pulverulent ore into a violently turbulent and upwardly flowing column of reducing gases, regulating the velocity of the gases so as to carry the ore upwardly and maintain it in suspension until it is reduced to metal, maintaining the temperature of the gases below the fusion temperature of the metal, and separating the metal from the gases.

2. The process of reducing ore to metal comprising maintaining a violently turbulent and upwardly flowing column of reducing gases in a furnace shaft, introducing pulverulent ore and a reducing agent into the column of gases, regulating the velocity of the gases so as to carry the ore upwardly and maintain it in suspension until it is reduced to metal, maintaining the temperature of the gases below the fusion temperature of the metal, and separating the metal from the gases.

3. The process of reducing iron ore to metal comprising maintaining a violently turbulent and upwardly flowing column of reducing gases in a furnace shaft, introducing pulverulent iron ore and a carbonaceous reducing agent into the column of gases, regulating the velocity of the gases so as to carry the ore upwardly and maintain it in suspension until it is reduced to metal, maintaining the temperature of the gases below the fusion temperature of the metal, and separating the metal from the gases.

4. The process of reducing ore to metal comprising continuously feeding fuel and combustion supporting gas into a furnace shaft to produce an upwardly flowing and violently turbulent column of flame and reducing gases, feeding ore into said column in such finely divided condition that the gases will carry the ore upwardly and reduce the ore to metal while in suspension, maintaining the temperature in the shaft below the fusion temperature of said metal, separating part of the metal from the column in the furnace, and carrying the remainder from the furnace to a collector where the remainder of the metal is separated from the gases.

5. The process of reducing ore to metal, comprising charging finely divided particles of ore into a violently turbulent and upwardly flowing column of flame and reducing gases having sufficient velocity to entrain and lift upwardly the particles of ore and to reduce the ore to metal having a greater specific gravity than the ore, regulating the velocity of the column of flame and gas to allow separation of the metallic particles by gravity from the column, and maintaining in the reduction zone a temperature below the fusion point of the metal.

6. The process of enriching the metallic content of ore, comprising continuously feeding fuel and combustion-supporting gas into a furnace shaft to produce an upwardly flowing and violently turbulent column of flame and reducing gases, feeding ore into the column of flame and reducing gases, said ore being in such finely divided condition that the gases will carry said ore upwardly and reduce the ore to metal, maintaining the temperature below the fusion point of the metal, and separting the metal enriched ore from the column.

7. The process of reducing ore to metal comprising feeding air and air-borne fuel into a furnace shaft to produce a violently whirling and upwardly flowing column of flame and reducing gases, feeding finely divided ore into the column of flame to promote contact between the ore and the reducing gases and to reduce the ore to metal, regulating the velocity of the gases and the flame so that the ore will be carried upwardly, maintaining the temperature in the portion of the shaft where reduction takes place below the fusion temperature of the metal, and separating the metal from the column of flame and gases.

8. The process of reducing ore to metal, comprising injecting a combustible mixture of carbonaceous fuel and air into a furnace shaft at a blast velocity of between 4,000 and 10,000 feet per minute to produce a rising and violently turbulent column of flame and heated reducing gases, injecting into the column of flame and gases finely divided ore of such particle size that 70-80% of the ore will pass through a 200 mesh sieve, maintaining the temperature in the reduction zone below the fusion point of the metal to reduce the ore to metal, and separating the metal from the column of gases and flame.

9. The process of reducing ore to metal, comprising maintaining a violently turbulent column of flame and reducing gases in a furnace shaft, injecting a plurality of streams of a pulverulent mixture of iron ore and carbonaceous reducing agent into the column, and regulating the velocity of the gases and flame so that it will carry the ore upwardly and maintain it in suspension until reduced to metal while maintaining the temperature below the fusion point of the metal and allow the metal to settle out due to increased specific gravity.

10. The process of reducing ore to metal, comprising maintaining an upwardly flowing and rotating column of flame and reducing gases in a furnace shaft, injecting a plurality of streams of a pulverulent mixture of iron ore and carbonaceous reducing material into the column, regulating the velocity of the gases so that the ore will be carried upwardly by the gases and reduced to metallic iron, maintaining the temperature below the fusion point of the metal, and centrifugally separating the metallic iron from the column by the centrifugal action of the rotating column.

11. The process of reducing ore to metal, comprising introducing a colloidal mixture of ore and oil into a rising column of flame and gases, creating violent turbulence of the flame and gases to maintain the colloidal particles of ore in suspension and to cause them to travel upwardly with the gases until the particles are reduced to metal, and maintaining the temperature in the reduction zone below the fusion point of the metal.

FRANK HODSON.
PAUL A. HIRSCH.